United States Patent [19]
Erikson

[11] Patent Number: 5,639,405
[45] Date of Patent: Jun. 17, 1997

[54] METHOD FOR PROVIDING SELECTIVE CONTROL OF A GAS ASSISTED PLASTIC INJECTION APPARATUS

[75] Inventor: Jon R. Erikson, Rochester Hills, Mich.

[73] Assignee: Elizabeth Erikson Trust, Rochester Hills, Mich.

[21] Appl. No.: 522,596

[22] Filed: Sep. 1, 1995

[51] Int. Cl.⁶ .................. B29C 45/76; B29C 45/78; B29D 22/00
[52] U.S. Cl. .................. 264/40.3; 264/40.6; 264/328.8; 264/328.12; 264/328.13; 264/572
[58] Field of Search .................. 264/40.3, 40.6, 264/328.8, 328.12, 328.13, 572

[56] References Cited

U.S. PATENT DOCUMENTS

| | | | |
|---|---|---|---|
| 4,101,617 | 7/1978 | Friederich | 264/572 |
| 4,474,717 | 10/1984 | Hendry | 264/45.5 |
| 4,555,225 | 11/1985 | Hendry | 425/4 R |
| 4,932,854 | 6/1990 | Matsuda et al. | 425/144 |
| 4,935,191 | 6/1990 | Baxi | 264/572 |
| 4,943,407 | 7/1990 | Hendry | 264/572 |
| 5,047,183 | 9/1991 | Eckhardt et al. | 264/40.3 |
| 5,069,859 | 12/1991 | Loren | 264/572 |
| 5,098,637 | 3/1992 | Hendry | 264/572 |
| 5,110,533 | 5/1992 | Hendry | 264/572 |
| 5,118,455 | 6/1992 | Loren | 264/40.3 |
| 5,133,914 | 7/1992 | Kubota et al. | 264/85 |
| 5,137,680 | 8/1992 | Hendry | 264/572 |
| 5,149,547 | 9/1992 | Gill | 425/145 |
| 5,151,242 | 9/1992 | Soeda et al. | 264/572 |
| 5,151,278 | 9/1992 | Baxi et al. | 425/130 |
| 5,198,238 | 3/1993 | Baxi | 425/130 |
| 5,200,127 | 4/1993 | Nelson | 264/85 |

FOREIGN PATENT DOCUMENTS

2158002  11/1985  United Kingdom.

*Primary Examiner*—Leo B. Tentoni
*Attorney, Agent, or Firm*—Bliss McGlynn, P.C.

[57] ABSTRACT

A control system for a gas assisted injection molding apparatus which provides precise and reproducible indication of when the injection of plastic is to terminate and when the pressured gas is to be introduced on basis of sensing of the location of the flow front of the injected plastic in the mold cavity. The flow front sensor control system according to the present invention includes: one or more sensors located at one or more predetermined locations of the cavity of a mold of a gas assisted injection molding apparatus, a controller which processes sensed data from the one or more sensors and thereupon sends a signal to the gas assisted plastic injection molding apparatus to discontinue plastic injection and introduce pressured gas. The preferred type of sensor is a temperature sensor; however, other types of sensors, such as a pressure sensor, may be used.

10 Claims, 3 Drawing Sheets

METHOD FOR PROVIDING SELECTIVE CONTROL OF A GAS ASSISTED PLASTIC INJECTION APPARATUS

BACKGROUND OF THE INVENTION

1. Field of the Invention

The present invention relates to apparatus for gas assisted thermoplastic inaction molding. More particularly, the present invention relates to a flow front control system therefor which provides for selective control of termination of plastic inaction and introduction of pressurized gas based upon predetermined processing of sensed flow front location information from inside the mold.

2. Description of the Prior Art

Gas assisted plastic inaction molding is a well established and commercially accepted method for providing plastic articles having an interior hollow. Such hollow plastic articles have numerous advantages, such as high strength, low weight, improved article appearance due to less shrinkage stress, and reduced plastic material cost A detailed discussion of the development of gas assisted injection molding technology is contained in U.S. Pat. No. 5,110,533.

Gas assisted plastic injection molding typically involves a mold having an interior cavity which defines the exterior shape of the plastic article to be provided, a sprue having an inaction aperture and a gate into the cavity, a plastic inaction apparatus which connects to the inaction aperture and rams a shot of thermoplastic thereinto, and a pressurized gas source which introduces pressurized gas into the injection aperture of the sprue. In typical operation, a shot of plastic is injected into the cavity via the sprue, then pressurized gas is introduced which causes the plastic to expand against the cavity walls. The gas pressure is maintained until the plastic has cooled sufficiently to be self supporting, whereupon the gas is vented, the mold opened, and the plastic article is removed from the cavity.

An example of gas assisted injection molding technology is presented in U.S. Pat. No. 5,118,455. Herein, a thermocouple is positioned to sense the temperature of the plastic resin at the injection aperture, and another thermocouple is positioned to sense the temperature of the plastic resin in the cavity. A control panel interprets the thermocouple signals and thereupon regulates the gas pressure to suit the viscosity of the plastic resin.

Problematically, the timing of the introduction of the pressurized gas is critical. If too early, the pressurized gas can blow past the flow front of the plastic thereby ruining the article, and if too late, then various objctionable stress marks can appear on the surface of the article, again thereby ruining the article.

A gas assisted plastic injection molding technology which is aimed at solving the problem of when to introduce the pressurized gas is described in U.S. Pat. No. 5,149,547. In this technology, introduction of the pressurized gas is based upon measurement of the amount of plastic shot that has been delivered to the cavity. An ideal amount of shot is first determined and the amount of plastic delivered per spindle revolution of the injection apparatus is also determined. The measurement of the shot is then provided by counting the revolutions of the spindle and then comparing this to a predetermined number of revolutions which would represent the desired shot.

A gas assisted plastic injection molding technology which is aimed at controlling the pressurized gas delivery and venting is described in U.S. Pat. No. 5,198,238. In this technology, a temperature or pressure sensor is located in the cavity of the mold and a microprocessor then uses sensed data therefrom to selectively control the operation of gas entry and gas venting.

While shot volume measurement is adequate in principle, in practice it is subject to the vagaries of temperature and pressure variations which may make the shot volume determination imprecise. Also, while microprocessor control over the pressurized gas is a laudable advance in the art, there remains needed not only microprocessor control over the pressurized gas but also the cessation of plastic injection. Accordingly, what remains needed in the art of gas assisted plastic injection molding which is a precise and reproducible indication of when the plastic injection is to cease and when the pressurized gas is to be introduced.

SUMMARY OF THE INVENTION

The present invention is a control system for a gas assisted injection molding apparatus which provides precise and reproducible indication of when the injection of plastic is to terminate and when the pressurized gas is to be introduced on the basis of sensing of the location of the flow front of the injected plastic in the mold cavity.

The flow front sensor control system according to the present invention includes: one or more sensors located at one or more predetermined locations of the cavity of a mold of a gas assisted injection molding apparatus, a controller which processes sensed data from the one or more sensors and thereupon sends a signal to the gas assisted plastic injection molding apparatus to discontinue plastic injection and introduce pressurized gas. The preferred type of sensor is a temperature sensor; however, other types of sensors, such as a pressure sensor, may be used.

In operation, one or more sensors is strategically located at the cavity wall for sensing information regarding the location of the flow front of plastic being injected into the cavity of the mold. The data from the one or more sensors is sent to the controller, wherein a comparison is made with respect to known data stored therein to thereby ascertain the location of the flow front When the flow front is determined by the controller to be at a predetermined location of the cavity, the controller sends a first signal to the plastic injection control mechanism of the gas assisted plastic injection molding apparatus to stop plastic injection and sends a second signal to the pressure regulator of the gas assisted plastic injection molding apparatus to begin introduction of the pressurized gas. The controller then sends a preprogrammed series of preselected pressure third signals to the pressure regulator whereby the pressure regulator adjusts the gas pressure to the pressure signals. After a predetermined delay time sufficient to allow adequate cooling of the injected plastic so that it becomes self supporting, the controller then sends a fourth signal to the pressure regulator to vent the gas from the mold. The third and fourth signals may be part of a combined preprogrammed sequence of signals.

Accordingly, it is an object of the present invention to provide a control system for a gas assisted plastic injection molding apparatus which tells the gas assisted plastic injection molding apparatus when to stop plastic injection and when to introduce pressurized gas in response to the control system sensing the position of the flow front of the injected plastic inside the mold cavity of the gas assisted plastic injection molding apparatus.

It is an additional object of the present invention to provide a control system for a gas assisted plastic injection molding apparatus, wherein sensing in the cavity of the injected plastic flow front by the control system provides precise and reproducible data for optimally indicating when to stop plastic injection and when to commence introduction of pressurized gas.

These, and additional objects, advantages, features and benefits of the present invention will become apparent from the following specification.

DETAILED DESCRIPTION OF THE PREFERRED EMBODIMENT

A. Overview

Figure 1:
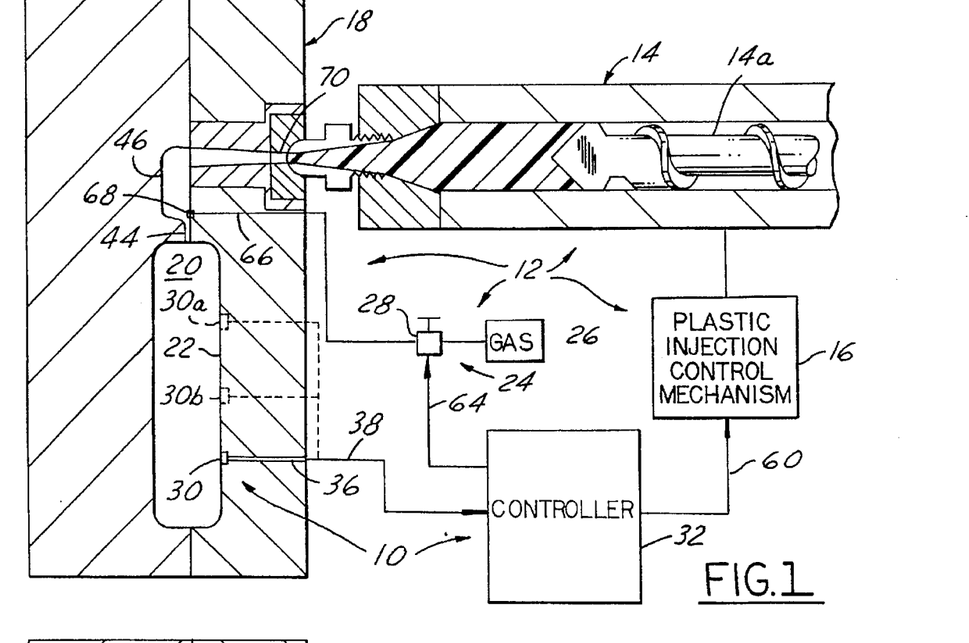
FIG. 1 is a schematic depiction of a plastic injection molding apparatus equipped with the flow front sensor control system according to the present invention, shown wherein plastic is about to be injected, and wherein a first gas introduction modality is shown.
Figure 2:
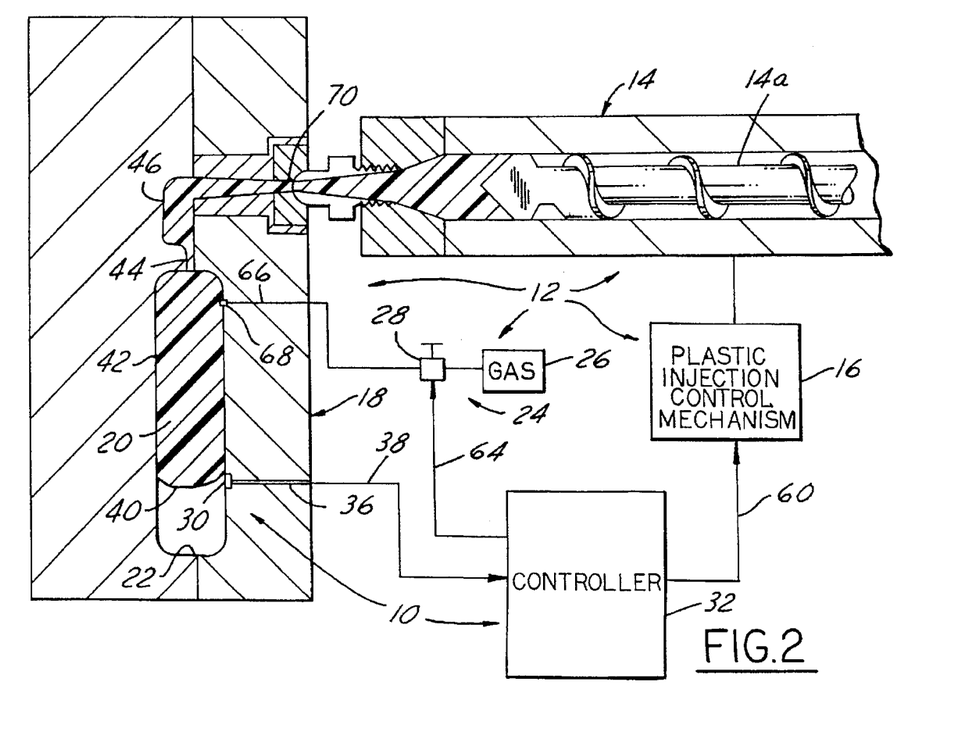
FIG. 2 is a schematic depiction of a plastic injection molding apparatus equipped with the flow front sensor control system according to the present invention, shown wherein plastic injection is about to cease and introduction of pressurized gas is about to commence in response to sensed data, wherein a second gas introduction modality is shown.
Figure 3:
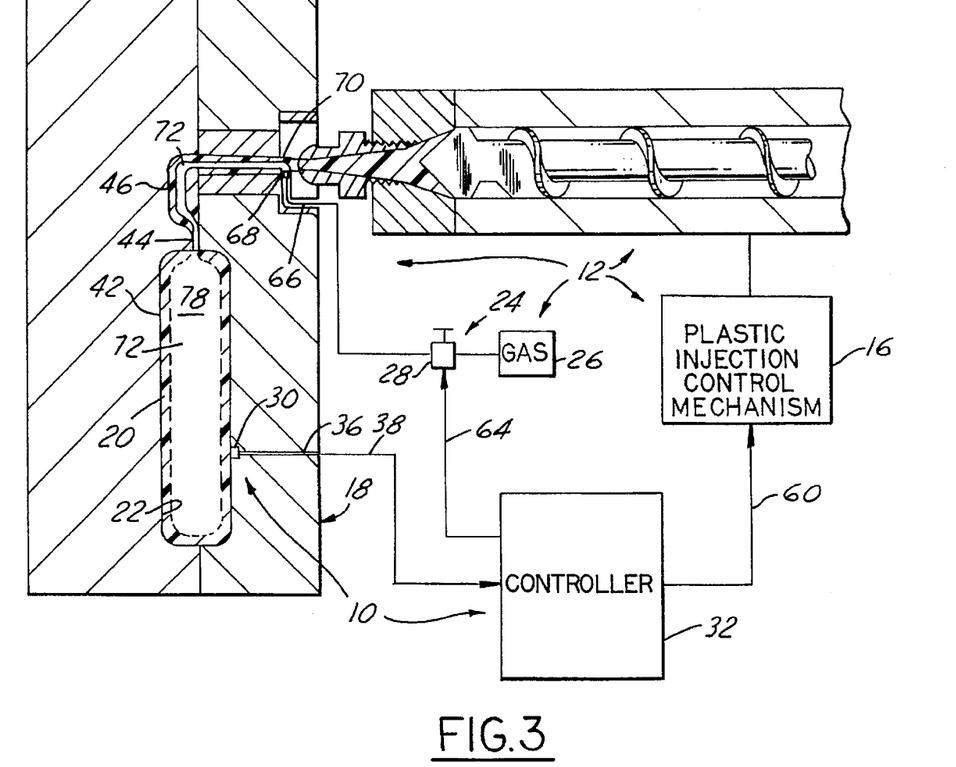
FIG. 3 is a schematic depiction of a plastic injection molding apparatus equipped with the flow front sensor control system according to the present invention, shown wherein a plastic article in the cavity has been fully formed in response to plastic injection and introduction of pressurized gas, wherein a third gas introduction modality is shown.

Referring now to the Drawing, FIGS. 1 through 3 schematically depict the flow front sensor control system 10 according to the present invention in conjunction with a gas assisted plastic injection molding apparatus 12. The gas assisted plastic injection molding apparatus 12 includes: a plastic injection apparatus 14 such as a screw type ram 14a controlled by a plastic injection control mechanism 16 such as for example an electric motor or hydraulic pump which drives the screw ram and/or a gate valve; a mold 18 having a cavity 20 therewithin wherein the shape of the cavity surface 22 defines the shape of the plastic article to be formed threat; and a pressurized gas apparatus 24 which includes a source 26 of pressurized gas and a pressure regulator 28. The flow front sensor control system 10 includes: one or more sensors 30 located at one or more predetermined locations at the cavity surface 22, a controller 32 in the form of a programmable data processing unit which stores data, receives data from the one or more sensors, processes the data and thereupon selectively sends signals to the gas assisted plastic injection molding apparatus 12 which signals include a "stop injection" signal and a "start gas" signal, whereby the gas assisted plastic injection molding apparatus effects to stop plastic injection and to begin pressurized gas introduction in response to those signals.

In operation, the gas assisted plastic injection molding apparatus 12 is started by an operator or by an automated sequencer. The controller 32 registers the ready state of the gas assisted plastic injection molding apparatus and then begins to sense data from the sensor 30 and store the data. Upon detection of a preset change in value between the presently sensed data and the recently stored data, which change indicates that the injected plastic flow front 40 is at a predetermined location in the cavity 20, the controller 32 generates a "stop injection" signal and sends this to the plastic injection control mechanism 16, whereupon the plastic injection control mechanism stops plastic injection. Simultaneously, the controller generates a "start gas" signal and sends this to the pressure regulator 28, whereupon the pressure regulator begins introduction of pressurized gas into the injected plastic. The controller 32 may provide a delay of either of the "stop injection" and the "start gas" signals before these are sent. Advantageously as well, the controller 32 preferably sends a series of preprogrammed "gas pressure" signals to the pressure regulator to thereby cause the pressure regulator to adjust the gas pressure in the plastic article. After a preset time sufficient for the plastic article to harden enough to be self supporting, the controller 32 then sends a "vent gas" signal to the pressure regulator to vent the pressurized gas from the mold. The gas assisted plastic injection molding apparatus 12 then conventionally opens the mold and the plastic article is removed from the cavity.

From this overview, it will be noted that the exactly correct moment to cease plastic injection and the exactly correct moment to introduce pressurized gas is determined by sensed flow front position data from inside the cavity. Accordingly, no matter what variations may occur during operation of the gas assisted plastic injection molding apparatus from sequence to sequence, because the flow front control system 10 sends signals based upon the location of the injected plastic flow front, always a reliably optimal moment for stopping plastic injection and starting pressurized gas introduction is reproducibly provided.

B. Detailed Description

Figure 4:
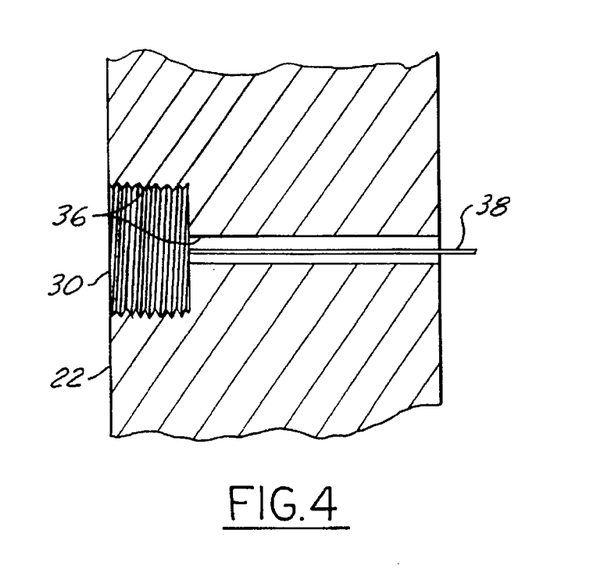
FIG. 4 is a detail view of a sensor which forms a part of the present invention, shown located at the wall of a mold cavity.

As shown in FIGS. 1 through 4, the mold 18 includes a cavity 20 whereat at least one sensor 30 is provided. FIG. 4 depicts one preferred modality for securing a sensor 30 to the cavity surface 22. A hole 36 is provided through the mold 18, wherein a portion thereof adjacent the cavity surface 22 is provided with threads. The sensor 30 is provided with threads and is threadingly engaged with the threaded portion of the hole 36. The electrical leads 38 from the sensor 30 pass through the hole 36 and connect with the controller 32. An alternative connection modality is to provide a seat in the cavity surface 22 and then weld the sensor 30 fixedly thereto. Another alternative is to simply affix the sensor 30 directly to the cavity surface 22 at a location where the surface appearance of the formed plastic article will not be disadvantageously affected by the presence of the sensor.

The preferred type of sensor 30 is a temperature sensor since these are reliable and inexpensive. A suitable temperature sensor 30 is a bi-metal thermocouple, such as for example type J, K T, E, S, and R. An alternative acceptable type of sensor 30 is a pressure sensor, however this is not as desirable as a temperature sensor because these are typically much more expensive.

The selected location of the sensor 30 at the cavity surface 22 with respect to the gate 44 of the sprue 46 is important, In this regard, the location of the sensor 30 is established by physical analysis of the cavity 20 and the geometry of the plastic article to be formed therein, as well as by trial and error data acquired during a series of test injection molding processes, wherein various locations of the sensor 30 are evaluated. Based upon this information, an optimum location for the sensor 30 at the cavity surface 22 is obtained. In order that a sensed rise in data (as for example temperature or pressure) be sensed by the sensor 30, it should be located downstream from the sprue gate 44 a distance sufficient that flow front has not overrun the location before it is time to effect cessation of plastic injection and introduction of pressurized gas, lest ability to detect the flow front location may be impossible or at least seriously impaired. For example, it may be determined that when the flow front 40 of the plastic 42 being injected is a preselected distance from a particular location, that it is then optimal for the plastic injection to cease and for the pressurized gas to be introduced. Accordingly, the temperature change experienced by a temperature type sensor 30 placed at that particular location (see FIG. 2) when the flow front is that preselected distance away is stored in memory of the controller 32. Thus, the controller will be able to ascertain when to send the "stop injection" and the "start gas" signals by sensing the change in signal from the temperature type sensor caused by the position of the flow front 40.

How the flow front sensor control system 10 automatically optimally controls operation of the gas assisted plastic injection molding apparatus 12 can be understood by simultaneous reference to FIGS. 1 through 5B.

Figure 5A:
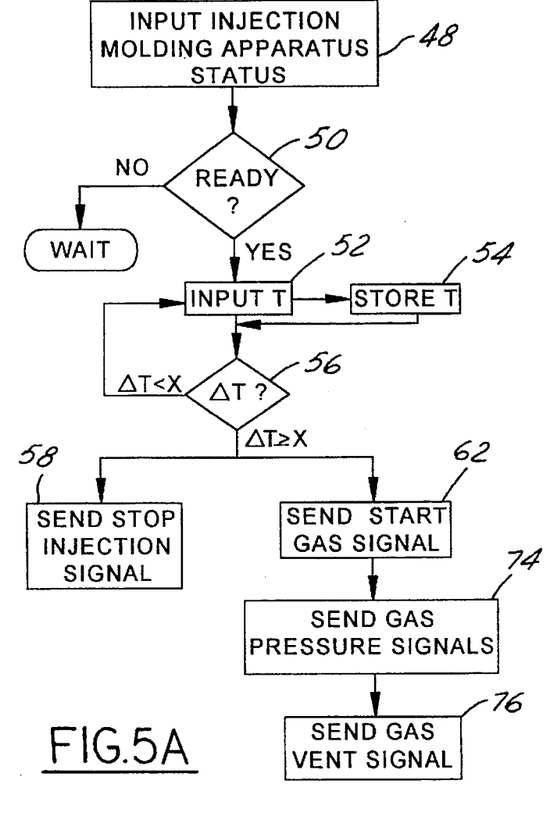
FIG. 5A is a flow chart of a data processing algorithm for the flow front sensor control system according to the present invention.
Figure 5B:
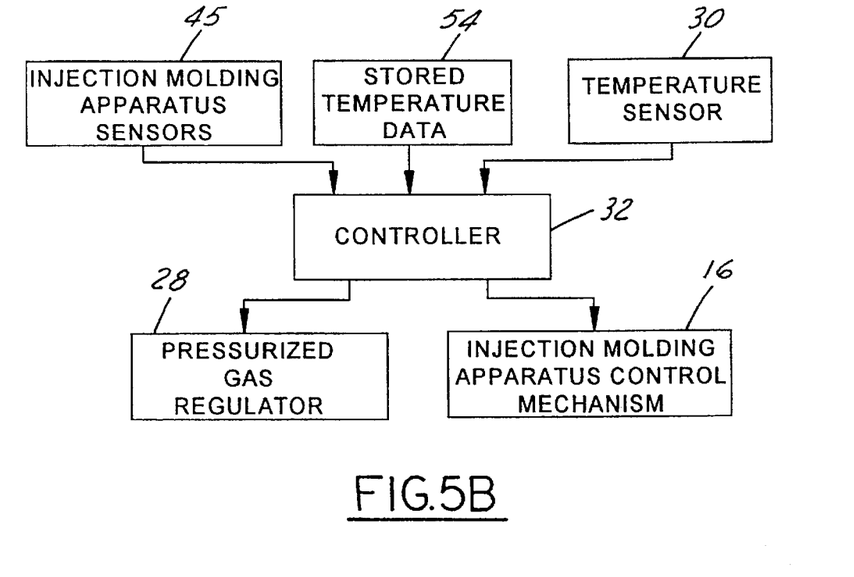
FIG. 5B is a chart of input/output nodes connected with the controller of the flow front control system according to the present invention.

Referring now to FIG. 5A, initially the controller 32 senses the gas assisted plastic injection molding apparatus status at block 48, wherein the status typically may include a mold closed signal and a purge guard closed signal from sensors 45 on the gas assisted plastic injection molding apparatus 12. The status signal from block 48 goes to decision block 50, whereat the controller ascertains if the gas assisted plastic injection molding apparatus is ready for sequencing; if no, then the controller waits; but if yes, then the controller continuously (or periodically) reads present temperature data from the sensor 30 at block 52 and then stores this data in block 54. This situation is depicted in FIG. 1.

At decision block 56, the presently sensed temperature data at block 52 is compared with the stored recently read temperature data from block 54. Thus, at decision block 56 the controller ascertains if the difference in temperature is less than a predetermined rise X; if no, then then the controller continues to acquire and store data; if yes, then a "stop injection" signal is generated at block 58 which is sent via a data line 60 to the plastic injection control mechanism 16 of the gas assisted plastic injection molding apparatus 12. Stopping injection in response to receipt of the "stop injection" signal may be either by simply stopping action of the screw ram 14a or by closing of a conventional valve gate. In this regard, the controller 32 may provide a preprogrammed delay between the initial detection of the predetermined rise X and the sending of the "stop injection" signal This situation is detected in FIG. 2, wherein the flow front 40 has reached a predetermined distance from the sensor 30, whereupon the expected temperature rise X has resulted in detection at the decision block 52. The predetermined distance can be any positive value including zero (ie., the flow front physically reaching the sensor 30).

Simultaneously upon detection of the predetermined temperature rise X at decision block 56, the controller 32 generates a "start gas" signal at block 62 which is sent via a data line 64 to the gas regulator 28 of the pressurized gas apparatus 24 of the gas assisted plastic injection molding apparatus 12. The gas regulator 28 thereupon introduces pressurized gas into the injected plastic via a gas line 66 which typically terminates in a needle pin 68. The location of the needle pin 68 may be at the plastic injection aperture 70 of the sprue 46 (as shown in FIG. 3), at the sprue 64 (as shown in FIG. 1), or at the cavity 20 (as shown in FIG. 2).

The pressurized gas 72 being introduced enters into the injected plastic 42 to thereby assist formation of the forming plastic article. The controller 32 may be provided with preprogrammed instructions which are stored in memory which provide a series of "gas pressure" signals which are generated at block 74 and then sent via the data line 64 to the pressure regulator 28 to thereby cause the pressure regulator to vary the gas pressure which, in turn, optimally regulates movement and internal pressure of the injected plastic 42. As shown at FIG. 3, the pressurized gas 72 now occupies a hollow 78 within the injected plastic 42, thereby forcing the plastic tightly against the cavity surfaces 22, thereby ensuring formation of a lightweight and blemish free plastic article forming within the cavity 20.

The controller 32 also provides a predetermined timed delay with respect to the sensing of the "start gas" signal before generating at block 76 a "vent gas" signal which is then sent via the data line 64 to the pressure regulator 28, whereupon the pressure regulator vents the gas 72 from the mold 18, which venting preferably also includes the hollow 78 formed in the injected plastic 42. The delay before sending the "vent gas" signal is based upon sufficient time for the injected plastic 42 to harden enough to be self supporting. Venting of the hollow 78 can also be accomplished via other modalities, such as effecting a sprue break, or moving a vent pin into the cavity, which may or may not be in response to the "vent gas" signal.

As depicted in phantom in FIG. 1, additional sensors 30a, 30b may be located progressively distanced from the gate 44 of the sprue 46, whereby rises in temperature or pressure at each is progressively sensed by the controller 32 and provide flow front movement information which is usable by the controller under preprogrammed instructions to assure the optimum timing for sending of the "stop injection" and the "start gas" signals.

The controller 32 used herein may be any programmable data processing unit, as for example a personal computer with an appropriate conventional data acquisition card, or a programmable logic controller, such as for example an Allan-Bradley SLC-500 Series PLC with a 1746-NT4 thermocouple read card.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for providing selective control of a gas assisted plastic injection molding apparatus comprising the steps of:

introducing plastic by injection into a mold;

sensing data with respect to location of a flow front of injected plastic within a cavity of a mold of a gas assisted plastic injection molding apparatus;

comparing the sensed data with stored data;

generating a "stop injection" signal and sending said "stop injection" signal to the gas assisted plastic injection molding apparatus to thereby cause the gas assisted plastic injection molding apparatus to cease introduction of plastic into the mold in response to detecting at said step of comparing a predetermined change in data between said sensed data and said stored data; and generating a "start gas" signal and sending said "start gas" signal to the gas assisted plastic injection molding apparatus to thereby cause the gas assisted plastic injection molding apparatus to begin introduction of pressurized gas into the mold in response to said step of detecting a predetermined change in data between said sensed data and said stored data.

2. The method of claim 1, where the step of generating a "stop injection" signal further comprises a first predetermined delay between the detecting of said predetermined change and sending said "stop injection" signal; and wherein the step of generating a "start gas" signal further comprises a second predetermined delay between the detecting of said predetermined change and sending said "start gas" signal.

3. The method of claim 2 further comprising the steps of:

providing a series of "gas pressure" signals; and sending said series of "gas pressure" signals to the gas assisted plastic injection molding apparatus to thereby cause the gas assisted plastic injection molding apparatus to selectively vary pressure of the pressurized gas in the mold.

4. The method of claim 3, further comprising the steps of:

providing a "vent gas" signal;

sending said "vent gas" signal, after a predetermined delay with respect to said sending of said "start gas" signal, to the gas assisted plastic injection molding apparatus to thereby cause the gas assisted plastic injection molding apparatus to vent the pressurized gas from the injected plastic.

5. The method of claim 4 further comprising, before said step of providing a "vent gas" signal, the steps of:

providing a series of "gas pressure" signals; and sending said series of "gas pressure" signals to the gas assisted plastic injection molding apparatus to thereby cause the gas assisted plastic injection molding apparatus to selectively vary pressure of the pressurized gas in the mold.

6. The method of claim 4, wherein said step of sensing comprises sensing data from a plurality of mutually spaced apart locations in the mold.

7. The method of claim 4, wherein said step of comparing comprises:

a) sensing a first present sensed data;

b) storing said first present sensed data to thereby provide said stored data;

c) comparing a second present sensed data with said stored data to thereby seek to detect said predetermined change in sensed data; and d) repeating steps a), b) c) until said predetermined change in sensed data is detected.

8. The method of claim 7, further comprising the steps of:

providing a "vent gas" signal;

sending said "vent gas" signal, after a predetermined delay with respect to said sending of said "start gas" signal, to the gas assisted plastic injection molding apparatus to thereby cause the gas assisted plastic injection molding apparatus to vent the pressurized gas from the mold.

9. The method of claim 8, further comprising, before said step of providing a "vent gas" signal, the steps of:

providing a series of "gas pressure" signals; and sending said series of "gas pressure" signals to the gas assisted plastic injection molding apparatus to thereby cause the gas assisted plastic injection molding apparatus to selectively vary pressure of the pressurized gas in the mold.

10. The method of claim 9, wherein said step of sensing comprises sensing data from a plurality of mutually spaced apart locations in the mold; and wherein said step of comparing comprises comparing the sensed data with stored data for each location of said series of locations.

* * * * *

UNITED STATES PATENT AND TRADEMARK OFFICE
CERTIFICATE OF CORRECTION

PATENT NO. : 5,639,405
DATED : June 17, 1997
INVENTOR(S) : Jon R. Erikson

It is certified that error appears in the above-indentified patent and that said Letters Patent is hereby corrected as shown below:

Title page, item
[57], Column 2, Under Abstract, line 4, "pressured", should be -- pressurized --.

Column 2, Under Abstract, line 13, "pressured" should be -- pressurized --.

Column 1, line 9, "inaction" should be -- injection --.

Column 1, line 12, "inaction" should be -- injection --.

Column 1, line 16, "inaction" should be -- injection --.

Column 1, line 27 (first occurrence), "inaction" should be -- injection --.

UNITED STATES PATENT AND TRADEMARK OFFICE
CERTIFICATE OF CORRECTION

PATENT NO. : 5,639,405
DATED : June 17, 1997
INVENTOR(S) : Jon R. Erikson

It is certified that error appears in the above-indentified patent and that said Letters Patent is hereby corrected as shown below:

Column 1, line 27 (second occurrence), "inaction" should be -- injection --.

Column 1, line 28, "inaction" should be -- injection --.

Column 1, line 49, "objctionable" should be -- objectionable --.

Column 2, line 41, after "front" (first occurrence), insert -- . --.

Column 3, line 55, "threat" should be -- thereat --.

UNITED STATES PATENT AND TRADEMARK OFFICE
CERTIFICATE OF CORRECTION

PATENT NO. : 5,639,405
DATED : June 17, 1997
INVENTOR(S) : Jon R. Erikson

It is certified that error appears in the above-indentified patent and that said Letters Patent is hereby corrected as shown below:

Column 5, line 22, after "controller" insert -- 32--.

Signed and Sealed this

Twenty-first Day of October 1997

*Attest:*

BRUCE LEHMAN

*Attesting Officer*         Commissioner of Patents and Trademarks